(12) United States Patent
Hayes et al.

(10) Patent No.: US 7,845,269 B2
(45) Date of Patent: Dec. 7, 2010

(54) PISTON WITH PIN BORE LUBRICATION FEATURES

(75) Inventors: James Russell Hayes, Campbell, MO (US); Gary D. Dowdy, Dexter, MO (US); Jeffery D. Wilkerson, Campbell, MO (US); John David Overbey, Bloomfield, MO (US)

(73) Assignee: Federal-Mogul Worldwide, Inc., Southfield, MI (US)

( * ) Notice: Subject to any disclaimer, the term of this patent is extended or adjusted under 35 U.S.C. 154(b) by 397 days.

(21) Appl. No.: 12/019,817

(22) Filed: Jan. 25, 2008

(65) Prior Publication Data

US 2008/0250922 A1 Oct. 16, 2008

Related U.S. Application Data

(60) Provisional application No. 60/910,876, filed on Apr. 10, 2007.

(51) Int. Cl.
*F02F 3/00* (2006.01)
*F16J 1/20* (2006.01)

(52) U.S. Cl. .......................................... 92/187; 92/153
(58) Field of Classification Search .................. 92/157, 92/158, 159, 186, 187
See application file for complete search history.

(56) References Cited

U.S. PATENT DOCUMENTS

| 2,282,085 A | 5/1942 | Nichols et al. |
|---|---|---|
| 2,742,883 A | 4/1956 | Smith |
| 3,179,021 A | 4/1965 | Holcombe |
| 3,425,323 A * | 2/1969 | Hill et al. ................... 92/186 |
| 3,494,262 A * | 2/1970 | Holcombe .................. 92/159 |
| 3,613,521 A | 10/1971 | Itano |
| 3,703,126 A * | 11/1972 | Haug ........................ 92/186 |
| 4,945,864 A | 8/1990 | Solomon et al. |
| 6,006,652 A | 12/1999 | Peng |
| 6,279,456 B1 * | 8/2001 | Ueshima et al. ............ 92/187 |
| 6,494,170 B2 | 12/2002 | Moloney et al. |
| 6,513,477 B1 | 2/2003 | Gaiser et al. |
| 6,539,910 B1 | 4/2003 | Gaiser et al. |
| 7,152,567 B2 * | 12/2006 | Anderson et al. ......... 123/193.6 |
| 7,278,390 B2 * | 10/2007 | Fezer ........................ 92/187 |

FOREIGN PATENT DOCUMENTS

| JP | 9195847 A | 7/1997 |
|---|---|---|
| JP | 10131729 A | 5/1998 |
| JP | 11-287154 | 10/1999 |
| JP | 11287154 A | 10/1999 |
| WO | WO 2004051119 A1 * | 6/2004 |

* cited by examiner

*Primary Examiner*—Thomas E Lazo
(74) *Attorney, Agent, or Firm*—Robert L. Stearns; Dickinson Wright, PLLC

(57) ABSTRACT

A piston has a piston body with a pair of pin bosses having pin bores aligned along a central axis. The pin bores have bearing surfaces, wherein at least one recess extends axially across at least one of the bearing surfaces. A groove extends partially about the bearing surface circumference and is arranged in fluid communication with the recess. The recess and groove provide a lubrication feature to the pin bore, while the bearing surface has an uninterrupted portion for enhanced load carrying capacity.

20 Claims, 4 Drawing Sheets

PISTON WITH PIN BORE LUBRICATION FEATURES

This application claims priority to U.S. Provisional Application Ser. No. 60/910,876, filed Apr. 10, 2007, and is incorporated herein by reference.

BACKGROUND OF THE INVENTION

1. Technical Field

This invention relates generally to pistons for internal combustion engines, and more particularly to pistons having lubrication features within a pin bore of the piston.

2. Related Art

It is know to provide a piston for use in an internal combustion engine with lubrication features with axial spaced and aligned pin bores of the piston. Typically, the lubrication features comprise grooves extending about the circumference of the pin bores between opposite sides of the pin bores. Oil ports typically extend from a source of oil supply, such as an oil gallery of the piston, into the associated groove. Although these constructions generally provide suitable lubrication to the pin bores to reduce friction between the pin bores and a wrist pin extending through the pin bores, they reduce the available bearing area of the pin bores, and thus, the loads are increased between the pin bores and the wrist pin. This is of particular concern in applications wherein the loads are relatively high, such as in high performance, high horsepower engine applications. In addition, the manufacture of the piston is complicated by requiring precise machining to intersect the grooves with the oil ports.

It is also known to incorporate lubrication features comprising scallops extending axially across the full width of the pin bores. The scallops have oil ports, that deliver oil thereto via an oil supply, such as from a gallery of the piston. The scallops act to distribute oil in the pin bosses, while also serving as oil reservoirs for oil to provide constant lubrication within the pin bores.

SUMMARY OF THE INVENTION

A piston has a piston body with a crown and a pair of pin bosses having pin bores aligned along a central axis. The pin bores have bearing surfaces with at least one recess extending axially across at least one of said bearing surfaces. A groove extends circumferentially about the bearing surface and is arranged in fluid communication with the recess, wherein the groove terminates at an end within the bearing surface. As such, the bearing surface, while having the recess and groove lubrication features, has an uninterrupted bearing surface portion to maximize the load capacity of the pin bore in the uninterrupted portion.

Accordingly, the pin bore is able to have a lubrication film layer maintained between its bearing surface and a wrist pin received therein, due to the lubrication features. In addition, the load capacity of the pin bore having the lubrication features is enhance via the uninterrupted bearing surface portion. A piston constructed with the lubrication features is useful in a variety of internal combustion engine applications, including those with high performance demands and space constraints, is economical in manufacture and has an increased useful life.

BRIEF DESCRIPTION OF THE DRAWINGS

These and other aspects, features and advantages of the invention will become readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
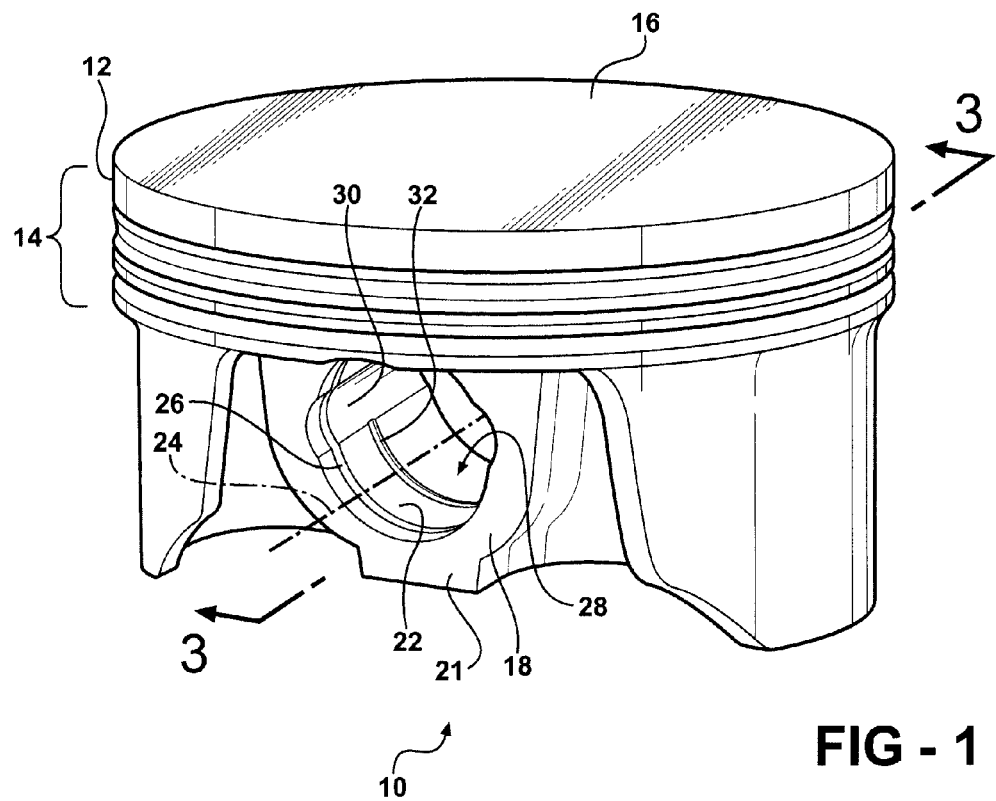
FIG. 1 is a perspective view of a piston having a lubrication feature constructed according to one presently preferred embodiment within pin bores of the piston.
Figure 2:
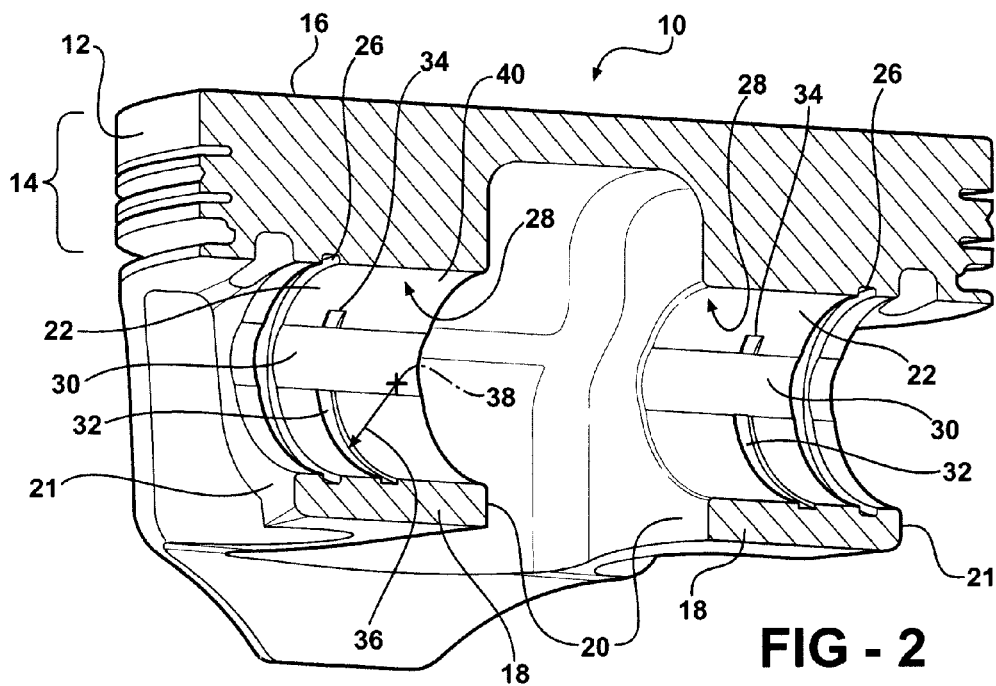
FIG. 2 is a cross-sectional perspective view of the piston taken generally along a central axis of the pin bores.
Figure 3:
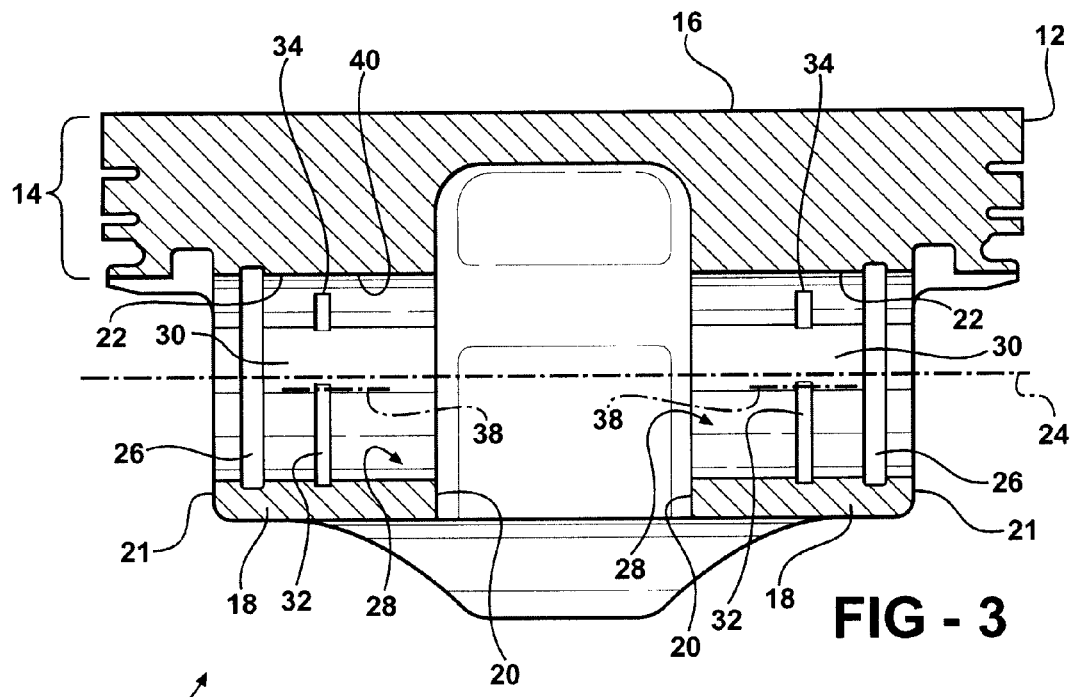
FIG. 3 is a plan view of the cross-section of FIG. 2.
Figure 4:
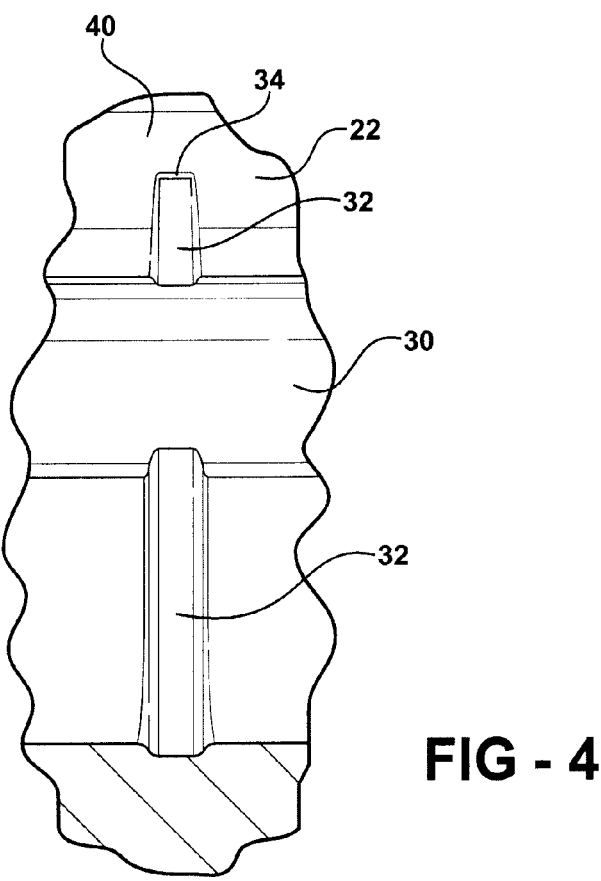
FIG. 4 is an enlarged view of the encircled area of FIG. 3.

Referring in more detail to the drawings, FIG. 1 illustrates piston 10 for use in high performance engines, such as those used in racing vehicles and boats, for example. The piston 10 has a crown 12 with an annular outer ring belt 14 extending downwardly from an upper surface 16 and a pair of pin bosses 18 depending from the crown 12. The pin bosses 18 have generally planar inner and outer faces 20, 21, respectively. The inner faces 20 are spaced laterally from one another sufficiently to receive a small end of a connecting rod (not shown) therebetween. The pin bosses 18 have pin bores 22 axially aligned with one another along a central axis 24, wherein the pin bores 22 are sized for receipt of a wrist pin (not shown) to couple the piston 10 to the connecting rod. The pin bores 22 preferably have annular grooves 26 adjacent the outer faces 21 for receipt of snap rings (not shown) to facilitate maintaining the wrist pin in its assembled state. The pin bores 22 have bearing surfaces 28 with lubrication features extending therein, wherein the lubrication features include recesses 30, also referred to as scallops, extending axially along the bearing surfaces 28, and grooves 32 extending partially about the circumference of the bearing surfaces 28 and intersecting the recesses 30 for fluid communication therewith. The lubrication features facilitate the flow of oil between the bearing surfaces 28 and the wrist pin, and thus, act to reduce friction between the pin bores 20 and the wrist pin in use, which in turn extends the useful life of the assembly in use.

Figure 5:
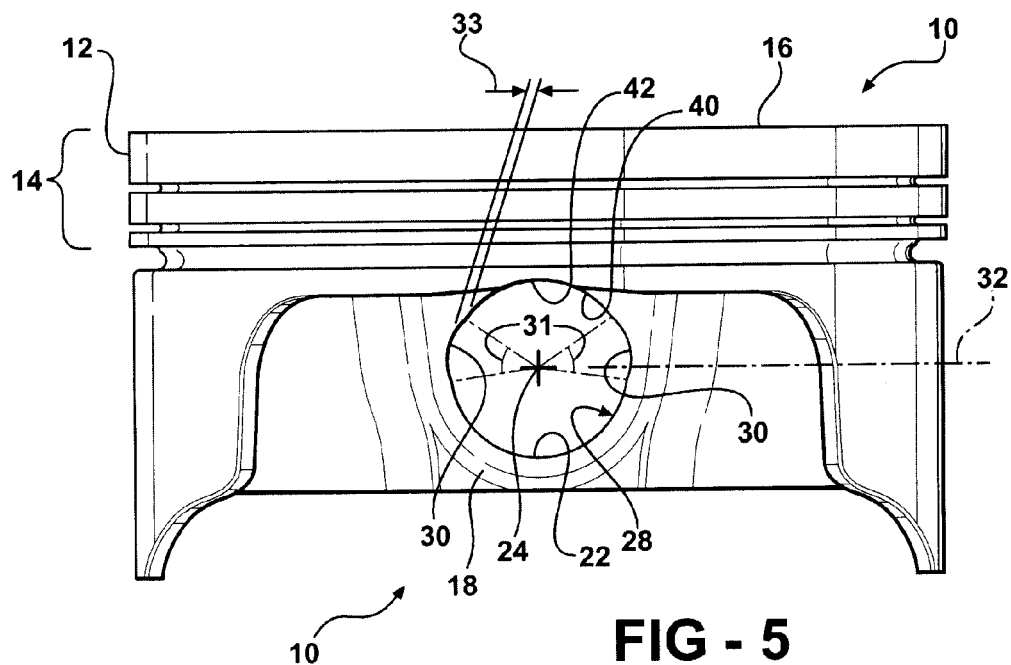
FIG. 5 is a plan view looking generally in the direction of arrow 5 of FIG. 3.
Figure 6:
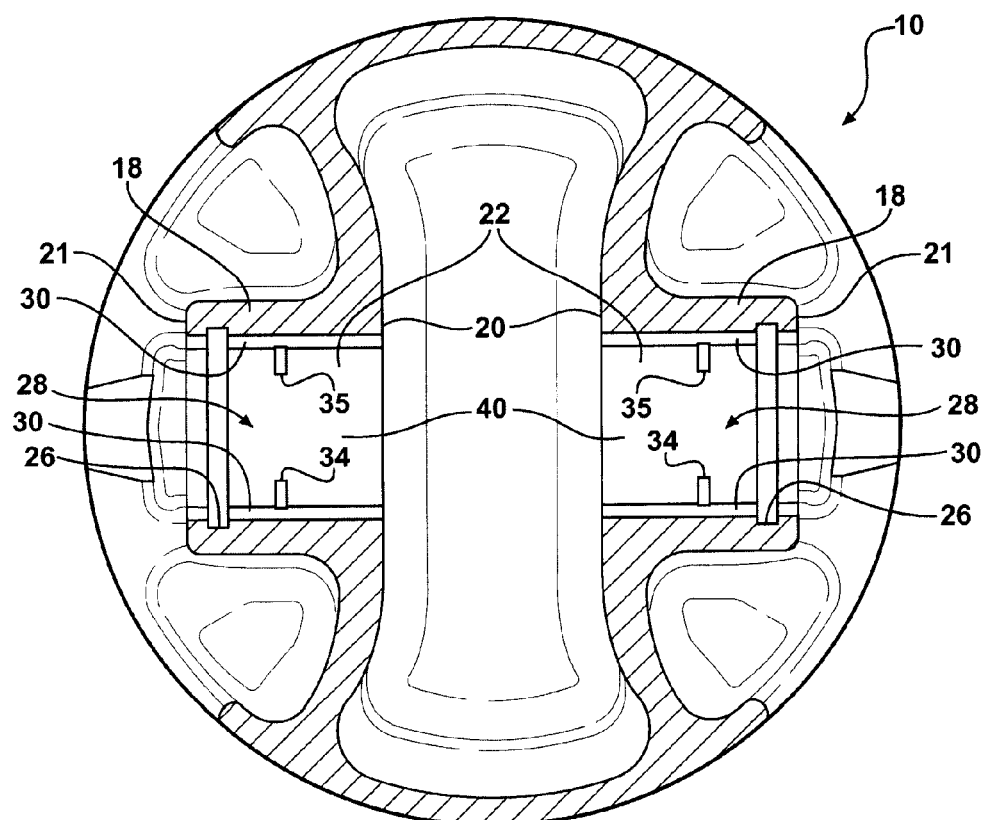
FIG. 6 is a cross-sectional bottom view of the piston taken generally along the central axis of the pin bores.

Each pin bore 22 preferably has at least one of the recesses 30, and more preferably a pair of the recesses 30. As shown in FIG. 5, the recesses are represented here, for example, as being in mirrored relation to one another on generally opposite sides of the respective pin bores 22. The recesses 30 extend radially outwardly from the bearing surfaces 28 into the pin bosses 18, and preferably across the entire width of the pin bosses between the opposite inner and outer faces 20, 21. The recesses 30 are preferably concave in shape to promote fluid flow therethrough, although they could be formed have different contours, if desired. With a concave contour, the recesses 30 form a smooth transition relative to the bearing surfaces 28, which promotes generally laminar fluid flow therethrough. The concave contours are formed, such as in a broaching operation, having a radius of curvature that is smaller than the radius of the bearing surfaces 28. The recesses 30 are formed, by way of example and without limitation, as spanning an arc 31 between about 20-40 degrees about the circumference of the pin bores 22, and are shown here as spanning an arc 31 of about 33 degrees. In addition, the recesses 30 are preferably formed having a maximum depth 33 of about 0.020-0.40 inches. Each recess 30 is offset upwardly relative to a horizontal plane 32 extending through the central axis 24, wherein a portion of the recesses 30 extend about 25 degrees upwardly from the central axis 24, while a portion extends downwardly about 8 degrees from the central axis 24. It should be recognized that the recesses 30 could be formed other than as expressly stated herein, with it being understood that this description is meant to covered the presently preferred embodiments, and not to be all inclusive.

Each pin bore 20 having one of the recesses 30 also has at least one of the grooves 32. The grooves 32 are located axially inwardly from the respective snap ring groove 26 and extend to at least one end circumferentially away from the respective recess 30, and preferably to a pair of opposite ends 34, 35 circumferentially away from the recess 30. The grooves 32 can be formed having a constant radius of curvature 36, wherein a central axis 38 of the radius of curvature 36 is offset from the central axis 24 of the pin bores 22. The central axis 38 of the grooves 32 is preferably offset vertically downward from the central axis 24 of the pin bores 22, such that the grooves 32 have a deepest portion, such as a depth of about 0.018-0.022 inches, for example, in a bottom portion of the pin bores 22, and taper off gradually to their opposite ends 34, 35 to form a smooth transition from the grooves 32 to the bearing surfaces 28 toward an upper portion of the pin bores 22. Preferably, the grooves 32 span an arc of about 280-300 degrees about the pin bores 22, and thus, the bearing surfaces 28 have continuous, uninterrupted surfaces 40 spanning about 60-80 degrees. As such, with the grooves 32 being offset from the central axis 24, they enter the recesses 30 having one depth and exit the recesses 30 toward their opposite ends 34, 35 having another depth, wherein the entry depth is slightly greater than the exit depth.

The uninterrupted surfaces 40 are preferably formed symmetrically about an upper portion of the pin bores 22, such that the surfaces 40 have symmetrical uninterrupted portions that extend generally the same distance circumferentially away from an apex 42 of the bearing surfaces 28. Accordingly, the uninterrupted surfaces 40 provide a maximum load surface area for interaction with the wrist pin during an upstroke of the piston and thus, during compression. With the enhanced lubrication provided by the lubrication features, and the maximized load surface area maintained over the uninterrupted surfaces, the useful life of the wrist pin and piston is maximized.

In operation, oil can infiltrate the pin bores 22 via the recesses 30, and then be circulated generally uniformly about the bearing surfaces 28 via the grooves 32. Although the piston construction discussed does not have oil delivery ports entering the pin bores 22, it should be recognized that oil can readily find its way into the pin bores 22 by circulating past the snap rings (not shown), and more particularly between the small end of the connecting rod (not shown) and the inner faces of the pin bores 22. Not having oil delivery ports can provide beneficial in maintaining an oil film throughout the pin bores 22 in that the oil can not be redirected outwardly from the pin bores 22 through an oil delivery port.

Figure 7:
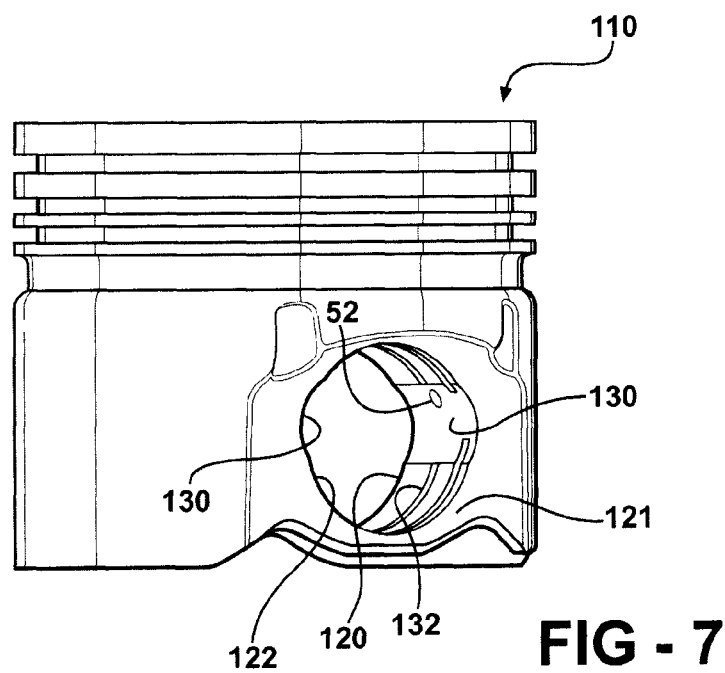
FIG. 7 is a perspective view of a piston having a lubrication feature constructed according to another presently preferred embodiment.
Figure 8:
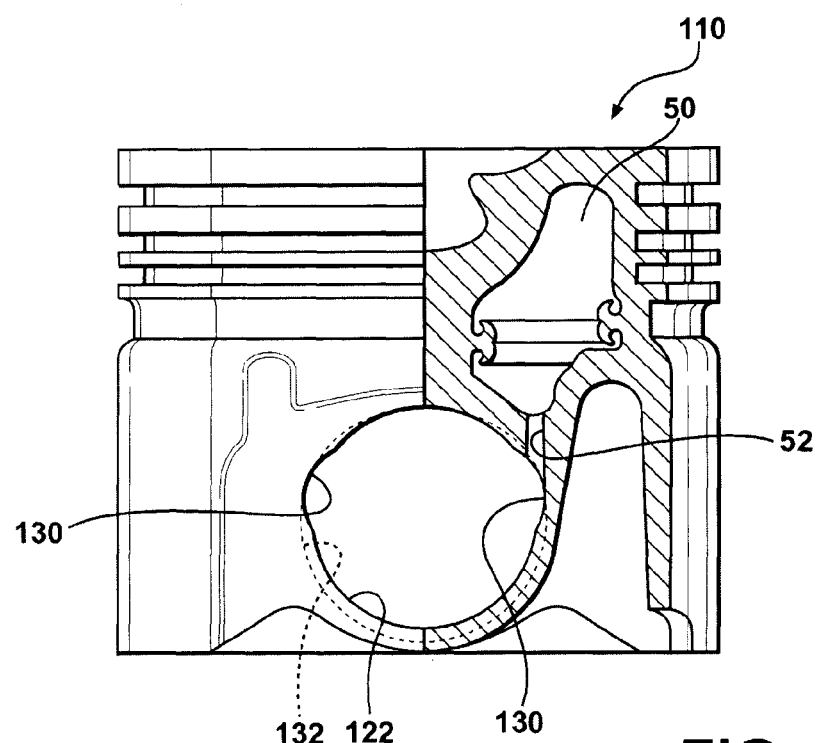
FIG. 8 is a partial cross-sectional view of the piston of FIG. 7.

Although the piston 10 discussed above does not have an oil gallery, or oil delivery ports extending into the pin bores 22, as shown in FIGS. 7 and 8, a piston 110 having an oil gallery 50 and lubrication features the same as discussed above is contemplated to be within the scope of the invention. For convenience, the features that are similar to those discussed above are given reference numerals offset 100 for the piston 110. Generally, for purposes herein, the most significant difference between the piston 110 and the piston 10 discussed above is that the piston 110 has the closed oil gallery 50. This type of piston is discussed in detail in U.S. Pat. No. 6,513,477 (referred to hereafter as "the '477 patent"), which is assigned to the applicants' assignee herein, with the '477 patent being incorporated herein by reference in its entirety.

The piston 110 has pin bores 122 with axially extending recesses 130 extending across bearing surfaces 128 thereof, and circumferential grooves 132 extending partially about the pin bores 122. Oil ports 52 are arranged in fluid communication with the oil gallery 50 and the recesses 130. Accordingly, in addition to oil entering the pin bores 122 from opposite faces 120, 121, the oil can be directed into the pin bore 122 from the oil gallery via the oil ports 52. Otherwise, the lubrication features for piston 110 are generally the same as above, and thus, need no further explanation.

Obviously, many modifications and variations of the present invention are possible in light of the above teachings. It is, therefore, to be understood that within the scope of the appended claims, the invention may be practiced otherwise than as specifically described.

What is claimed is:

1. A piston, comprising:
a piston body having a crown;
a pair of pin bosses having pin bores aligned along a central axis, said pin bores having bearing surfaces;
at least one recess extending axially across at least one of said bearing surfaces; and
a groove in fluid communication with said at least one recess, said groove extending in a circumferential direction about said at least one of said bearing surfaces and terminating at an end within said at least one of said bearing surfaces, said groove having a constant radius with a central axis that is offset from the pin bore central axis.

2. The piston of claim 1 wherein said groove has a pair of ends terminating circumferentially away from said recess.

3. The piston of claim 2 wherein said at least one of said bearing surfaces has an uninterrupted portion between said pair of ends of said groove.

4. The piston of claim 3 wherein said uninterrupted portion is between said central axis and said crown.

5. The piston of claim 4 wherein said uninterrupted portion extends between about 60-80 degrees.

6. The piston of claim 1 wherein said at least one bearing surface has an uninterrupted portion extending axially across said at least one of said bearing surfaces, said uninterrupted portion being void of said groove.

7. The piston of claim 1 wherein said groove extends circumferentially in opposite directions from said at least one recess.

8. The piston of claim 1 wherein said crown has an oil gallery that is internal to said crown, and further comprising an oil port arranged in fluid communication with said oil gallery and said at least one recess.

9. The piston of claim 1 wherein said groove transitions in a gradual taper to said end.

10. The piston of claim 1 wherein said groove has a constant radius.

11. A piston, comprising:
a piston body having a crown and an internal oil gallery chamber to accommodate cooling oil inside of said crown;

a pair of pin bosses having pin bores aligned along a central axis, said pin bores having circumferentially extending bearing surfaces;

at least one recess extending axially across at least one of said bearing surfaces and whose deepest region lies above said pin bore axis;

an oil delivery port extending from said internal oil gallery to said at least one recess to establish oil flow communication therebetween; and a groove in fluid communication with said at least one recess, said groove extending less than 360 degrees about said bearing surface.

12. The piston of claim 11 wherein said groove has at least one end terminating at said bearing surface.

13. The piston of claim 12 wherein said groove has a gradual taper to said end.

14. The piston of claim 12 wherein said groove has a pair of ends terminating at said bearing surfaces.

15. The piston of claim 14 wherein said groove has a gradual taper to said pair of ends.

16. The piston of claim 14 wherein said at least one of said bearing surfaces has an uninterrupted portion extending axially between said pair of ends of said groove.

17. The piston of claim 16 wherein said uninterrupted portion is between said central axis and said crown.

18. The piston of claim 16 wherein said uninterrupted portion extends between about 60-80 degrees.

19. The piston of claim 11 wherein said groove has a constant radius.

20. The piston of claim 19 wherein said constant radius has a central axis that is offset from said pin bore central axis.

* * * * *